(12) United States Patent
Billman et al.

(10) Patent No.: US 11,972,434 B2
(45) Date of Patent: Apr. 30, 2024

(54) DISTRIBUTED CREDIT ACCOUNT INFORMATION

(71) Applicant: BREAD FINANCIAL PAYMENTS, INC., Columbus, OH (US)

(72) Inventors: Christian Billman, Gahanna, OH (US);
Uchenna Chilaka, Blacklick, OH (US);
Jess Lawrence, Lewis Center, OH (US)

(73) Assignee: BREAD FINANCIAL PAYMENTS, INC., Columbus, OH (US)

( * ) Notice: Subject to any disclaimer, the term of this patent is extended or adjusted under 35 U.S.C. 154(b) by 0 days.

(21) Appl. No.: 16/689,642

(22) Filed: Nov. 20, 2019

(65) Prior Publication Data

US 2020/0372506 A1  Nov. 26, 2020

Related U.S. Application Data

(60) Provisional application No. 62/852,909, filed on May 24, 2019.

(51) Int. Cl.
*G06Q 20/40* (2012.01)
*G06Q 20/06* (2012.01)
*G06Q 20/34* (2012.01)
*G06Q 40/03* (2023.01)

(52) U.S. Cl.
CPC ....... *G06Q 20/405* (2013.01); *G06Q 20/0658* (2013.01); *G06Q 20/341* (2013.01); *G06Q 20/407* (2013.01); *G06Q 40/03* (2023.01)

(58) Field of Classification Search
CPC ............ G06Q 20/405; G06Q 20/0658; G06Q 20/341; G06Q 20/407; G06Q 40/025; G06Q 40/03; G06Q 20/40; G06Q 20/34; G06Q 20/06
See application file for complete search history.

(56) References Cited

U.S. PATENT DOCUMENTS

| | | | | |
|---|---|---|---|---|
| 5,537,642 A * | 7/1996 | Glowny | ............... | H04L 67/148 714/E11.097 |
| 5,805,798 A * | 9/1998 | Kearns | ................ | G06F 11/1471 714/48 |
| 5,964,831 A * | 10/1999 | Kearns | ................... | G06Q 30/06 710/39 |
| 6,347,322 B1 * | 2/2002 | Bogantz | .................. | G06F 16/27 |
| 6,757,745 B1 * | 6/2004 | Hamann | .............. | H04Q 3/0062 370/469 |
| 6,871,193 B1 * | 3/2005 | Campbell | .............. | G06Q 30/06 705/40 |

(Continued)

FOREIGN PATENT DOCUMENTS

| | | | | |
|---|---|---|---|---|
| EP | 1153375 B1 * | 1/2003 | ............. | G06Q 20/00 |
| WO | WO-2015143570 A1 * | 10/2015 | ............. | G06Q 20/24 |

*Primary Examiner* — Kenneth Bartley

(57) ABSTRACT

A system and method for distributed credit account information is disclosed. The method receives, at a subsystem, a subset of credit account information from a main rules system. The subsystem then determines that a communication to the main rules system is disrupted. The subsystem utilizes the subset of credit account information to make at least one purchase authorization decision. After determining that the communication to the main rules system is operational, the subsystem provides a reconciliation data file including the at least one purchase authorization decision to the main rules system.

14 Claims, 5 Drawing Sheets

(56) References Cited

U.S. PATENT DOCUMENTS

| | | | | |
|---|---|---|---|---|
| 7,036,048 B1* | 4/2006 | Gill | | G06Q 20/18 |
| | | | | 902/8 |
| 7,380,155 B2* | 5/2008 | Fung | | G06F 11/1662 |
| | | | | 714/4.11 |
| 7,392,317 B2* | 6/2008 | Halpern | | G06F 9/4843 |
| | | | | 709/219 |
| 7,401,264 B1* | 7/2008 | Gill | | G07F 9/026 |
| | | | | 902/8 |
| 7,620,842 B2* | 11/2009 | Fung | | G06F 11/2028 |
| | | | | 714/4.11 |
| 8,161,330 B1* | 4/2012 | Vannatter | | G07F 19/207 |
| | | | | 714/48 |
| 8,746,551 B2* | 6/2014 | Bryant | | G06F 11/008 |
| | | | | 235/379 |
| 8,768,838 B1* | 7/2014 | Hoffman | | G06Q 40/00 |
| | | | | 705/44 |
| 9,741,035 B1* | 8/2017 | White | | G06Q 20/405 |
| 9,881,302 B1* | 1/2018 | White | | G06Q 20/389 |
| 10,366,378 B1* | 7/2019 | Han | | G06Q 20/202 |
| 10,417,625 B2* | 9/2019 | Shmilovitz | | G06Q 20/202 |
| 10,692,081 B2* | 6/2020 | Burdett | | G06Q 20/40 |
| 10,854,049 B2* | 12/2020 | Waughtal | | G07G 1/0036 |
| 2002/0077178 A1* | 6/2002 | Oberberger | | G07F 17/3248 |
| | | | | 463/20 |
| 2002/0169716 A1* | 11/2002 | Johnson | | G06Q 40/04 |
| | | | | 705/40 |
| 2003/0171145 A1* | 9/2003 | Rowe | | G06Q 20/02 |
| | | | | 463/25 |
| 2004/0078340 A1* | 4/2004 | Evans | | G06Q 40/025 |
| | | | | 705/64 |
| 2004/0205011 A1* | 10/2004 | Northington | | G06Q 40/02 |
| | | | | 705/35 |
| 2004/0230535 A1* | 11/2004 | Binder | | G06Q 20/24 |
| | | | | 705/64 |
| 2005/0080703 A1* | 4/2005 | Chiesa | | G06Q 40/00 |
| | | | | 705/36 R |
| 2006/0015450 A1* | 1/2006 | Guck | | G06Q 20/10 |
| | | | | 705/43 |
| 2006/0036879 A1* | 2/2006 | Wahler | | G06F 11/3058 |
| | | | | 713/300 |
| 2006/0117212 A1* | 6/2006 | Meyer | | G06F 3/0635 |
| | | | | 714/4.11 |
| 2007/0007331 A1* | 1/2007 | Jasper | | G07G 1/14 |
| | | | | 235/379 |
| 2007/0034685 A1* | 2/2007 | Botham | | G06Q 20/425 |
| | | | | 235/382 |
| 2008/0126213 A1* | 5/2008 | Robertson | | G07G 1/14 |
| | | | | 705/21 |
| 2011/0202413 A1* | 8/2011 | Stewart | | G06Q 20/40 |
| | | | | 705/16 |
| 2011/0320291 A1* | 12/2011 | Coon | | G06Q 20/425 |
| | | | | 705/16 |
| 2012/0017031 A1* | 1/2012 | Mashtizadeh | | G06F 9/45545 |
| | | | | 711/6 |
| 2012/0173423 A1* | 7/2012 | Burdett | | G06Q 20/3223 |
| | | | | 705/44 |
| 2013/0304561 A1* | 11/2013 | Warner | | G06Q 30/0233 |
| | | | | 705/14.27 |
| 2014/0006264 A1* | 1/2014 | Powell | | G06Q 20/407 |
| | | | | 705/39 |
| 2014/0143074 A1* | 5/2014 | Kolls | | G07F 9/026 |
| | | | | 705/16 |
| 2016/0314449 A1* | 10/2016 | Shmilovitz | | G06Q 20/202 |
| 2017/0046685 A1* | 2/2017 | Tatara | | G06Q 20/40 |
| 2017/0139977 A1* | 5/2017 | Batra | | G06Q 40/12 |
| 2017/0228954 A1* | 8/2017 | Evans | | E05B 19/0005 |
| 2017/0278325 A1* | 9/2017 | Simanek | | G06Q 20/349 |
| 2017/0345007 A1* | 11/2017 | Matteson | | G06Q 20/227 |
| 2018/0091316 A1* | 3/2018 | Stradling | | G06Q 20/065 |
| 2019/0026737 A1* | 1/2019 | McLaughlin | | G06Q 20/40 |
| 2019/0156301 A1* | 5/2019 | Bentov | | H04L 9/3239 |
| 2019/0303931 A1* | 10/2019 | Valencia | | G06Q 20/3278 |
| 2020/0126072 A1* | 4/2020 | Karaivanov | | G06Q 20/401 |
| 2020/0250644 A1* | 8/2020 | Oberholtzer | | G06Q 20/027 |

* cited by examiner

DISTRIBUTED CREDIT ACCOUNT INFORMATION

CROSS-REFERENCE TO RELATED APPLICATIONS (PROVISIONAL)

This application claims priority to and benefit of U.S. Provisional Patent Application No. 62/852,909 filed on May 24, 2019, entitled "DISTRIBUTED CREDIT ACCOUNT INFORMATION" by Billman et al., and assigned to the assignee of the present application, the disclosure of which is hereby incorporated herein by reference in its entirety.

BACKGROUND

Credit account systems will have a main rules system. This is the system that authorizes purchases, makes credit account approval and denial decisions, sets credit account limits, and the like. However, if communication with the main rules system goes down, a store that uses the main rules system will not be able to perform any authorized credit purchases or provide any customers with the opportunity to apply for a store credit account.

BRIEF DESCRIPTION OF THE DRAWINGS

The accompanying drawings, which are incorporated in and form a part of this specification, illustrate various embodiments and, together with the Description of Embodiments, serve to explain principles discussed below. The drawings referred to in this brief description should not be understood as being drawn to scale unless specifically noted.

DESCRIPTION OF EMBODIMENTS

Figure 1:
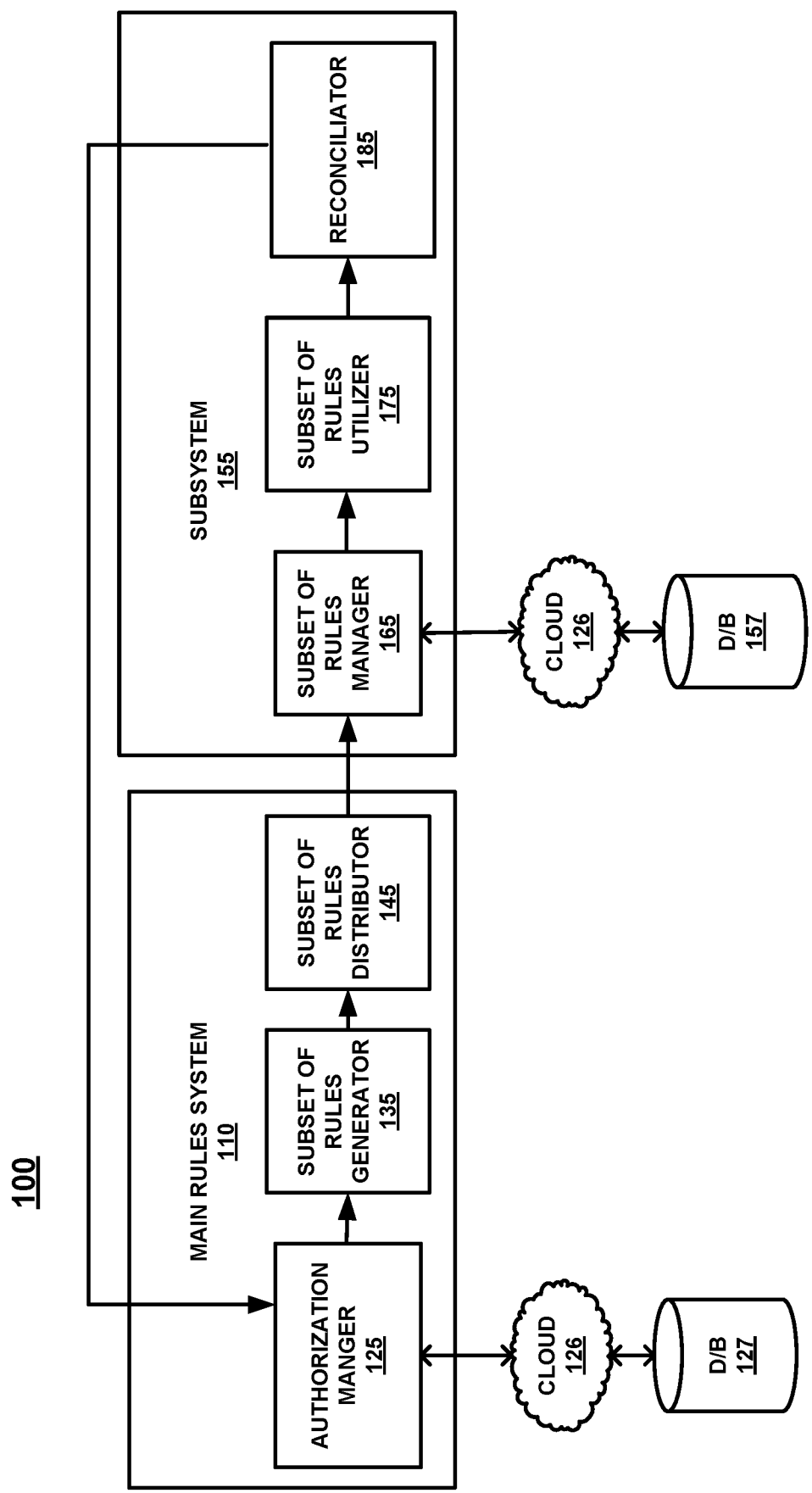
FIG. 1 is a block diagram of a distributed risk rules system, in accordance with an embodiment.

Reference will now be made in detail to various embodiments, examples of which are illustrated in the accompanying drawings. While the subject matter will be described in conjunction with these embodiments, it will be understood that they are not intended to limit the subject matter to these embodiments. On the contrary, the subject matter described herein is intended to cover alternatives, modifications and equivalents, which may be included within the spirit and scope as defined by the appended claims. In some embodiments, all or portions of the electronic computing devices, units, and components described herein are implemented in hardware, a combination of hardware and firmware, a combination of hardware and computer-executable instructions, or the like. In one embodiment, the computer-executable instructions are stored in a non-transitory computer-readable storage medium. Furthermore, in the following description, numerous specific details are set forth in order to provide a thorough understanding of the subject matter. However, some embodiments may be practiced without these specific details. In other instances, well-known methods, procedures, objects, and circuits have not been described in detail as not to unnecessarily obscure aspects of the subject matter.

NOTATION AND NOMENCLATURE

Unless specifically stated otherwise as apparent from the following discussions, it is appreciated that throughout the present Description of Embodiments, discussions utilizing terms such as "selecting", "outputting", "allowing," "limiting," "issuing," "preventing," "inputting", "providing", "receiving", "utilizing", "obtaining", "performing", "accessing", "authorizing" or the like, often refer to the actions and processes of an electronic computing device/system, such as a desktop computer, notebook computer, tablet, mobile phone, and electronic personal display, among others. The electronic computing device/system manipulates and transforms data represented as physical (electronic) quantities within the circuits, electronic registers, memories, logic, and/or components and the like of the electronic computing device/system into other data similarly represented as physical quantities within the electronic computing device/system or other electronic computing devices/systems.

It should be appreciated that the obtaining, accessing, or utilizing of information conforms to applicable privacy laws (e.g., federal privacy laws, state privacy laws, etc.).

Embodiments described herein provide a novel method and system for distributing a "light" version of rules and authorization to one or more retailers, so that if the main rules system goes down, the "light" rules that have been distributed to the retailer can provide some reduced level of throughput instead of the retailer denying all aspects of credit authorization, approval and the like when the main rules system is down.

Importantly, the embodiments of the present invention, as will be described below, provide an approach for distributed rules which differs significantly from the conventional processes. In conventional approaches, if the main rules system was down, there was no ability for a retailer to perform any credit related purchases, open any new credit accounts, or the like. As such, any communication disruption (whether accidental, weather related, purposeful (e.g., a denial of service attach)) between the retailer and the main rules system resulted in lost sales and frustration for all parties involved. However, the embodiments described herein provide a distributed "light" rules system that allows a subset of decisions to be made at the retailer when communication between the retailer and the main rules system is disrupted.

Thus, the embodiments described herein, provide a completely new and different use for a rules subsystem which is different than what was previously done because of the Internet-centric nature of the digital authorization process.

As will be described in detail, the various embodiments of the present invention do not merely implement conventional processes on a computing system. Instead, the various embodiments of the present invention, in part, provide a novel process for providing a "light" version of credit account rules and authorization which is necessarily rooted in Internet-centric computer technology to overcome a problem specifically arising due to communications disruptions in a digital communications environment.

Moreover, the embodiments do not recite a mathematical algorithm; nor do they recite a fundamental economic or longstanding commercial practice. Instead, they address a business challenge that has been born in the Internet-centric environment. Thus, the embodiments do not merely recite the performance of some business practice known from the pre-Internet world along with the requirement to perform it on a computing device. Instead, the embodiments are necessarily rooted in network-centric environments in order to overcome new problems specifically arising in the realm of credit account and reward account rules and authorization.

Operation

Referring now to FIG. 1, a block diagram of a distributed risk rules system 100 is shown in accordance with an embodiment. In one embodiment, distributed risk rules system 100 includes a main rules system 110 and a subsystem 155. In one embodiment, the subset of rules and authorization criteria are distributed from the main rules system 110 to the subsystem 155 (e.g., a certain retailer's computing system), so that if the main rules system 110 goes down, the "next best" rules that have been distributed to the retailers (e.g., subsystem 155) can be used instead of the retailer having to turn down all requests while the main rules system 110 is down. In one embodiment, subsystem 155 could be a point of sale (POS) system, a hand-held associate device, or the like. In one embodiment, subsystem 155 is a proprietary device that is in communication with the POS or the like, but whose stored data is inaccessible by any system or device other than proprietary authorization manager 125.

Main rules system 110 includes proprietary authorization manager 125, subset of rules generator 135, and subset of rules distributor 145. In one embodiment, main rules system 110 is a computing system such as computer system 500 described in detail in the FIG. 5 discussion herein.

In one embodiment, authorization manager 125 is a rules engine that uses information from one or more databases (such as database 127) to make credit account approval decisions, credit account authorization decisions, reward account determinations, and the like. In one embodiment, authorization manager 125 communicates with the one or more databases via cloud 126 which may be a LAN, WAN, Internet connection, or the like.

Subset of rules generator 135 works with authorization manager 125 to develop a subset of the authorization rules for one or more different retailers. In one embodiment, the development of the subset of rules is retailer dependent. For example, one retailer may have a certain credit score requirement or other metric that is different than (or has a different value than) a second retailer.

Once the subset of rules is generated, subset of rules distributor 145 will distribute the subset of rules to each subsystem 155. In one embodiment, the subset of rules will be distributed by subset of rules distributor 145 on a predefined schedule. In one embodiment, the subset of rules will only be distributed by subset of rules distributor 145 if a request is received from subsystem 155 or if there are changes that have been made to the subset of rules.

Subsystem 155 includes subset of rules manager 165, subset of rules utilizer 175, and reconciliator 185. In one embodiment, subsystem 155 is a computing system such as computer system 500 described in detail in the FIG. 5 discussion herein.

In one embodiment, subset of rules manager 165 will manage the storage of the subset of rules in one or more databases (such as database 157). In one embodiment, subset of rules manager 165 communicates with the one or more databases via cloud 126 which may be a LAN, WAN, Internet connection, or the like.

In one embodiment, subset of rules utilizer 175 is a rules engine that uses the subset of rules to make credit account approval decisions, credit account authorization decisions, reward account determinations, and the like. For example, when the main rules system 110 is not available, subsystem 155 will be able to feed the application, credit charge authorization, or the like, into the subset of rules utilizer 175. The subset of rules utilizer 175 will then allow the subsystem 155 to make a new account decision, receive an authorization, and the like.

Reconciliator 185 will provide any decisions that are made by subset of rules utilizer 175 back to authorization manager 125 of main rules system 110 as part of a data file. In so doing, main rules system 110 will be able to maintain a record of each transaction, authorization, new account generation, or the like that was performed by subsystem 155. Moreover, authorization manager 125 will be able to provide an analysis of any of the new submissions from subsystem 155 using the full rules database.

The analysis could include the review of credit limits provided to new accounts and an option for the new account to receive a modification to the existing credit limit. The analysis could include a review of denied applications to see if there were other underlying aspects that would allow the customer to be sent a pre-approval or otherwise provided a second chance at obtaining the credit account. The analysis could include an updating of a reward activity based on other information that was not known to subsystem 155 which would result in a different reward being given to the customer, and the like.

Figure 2:
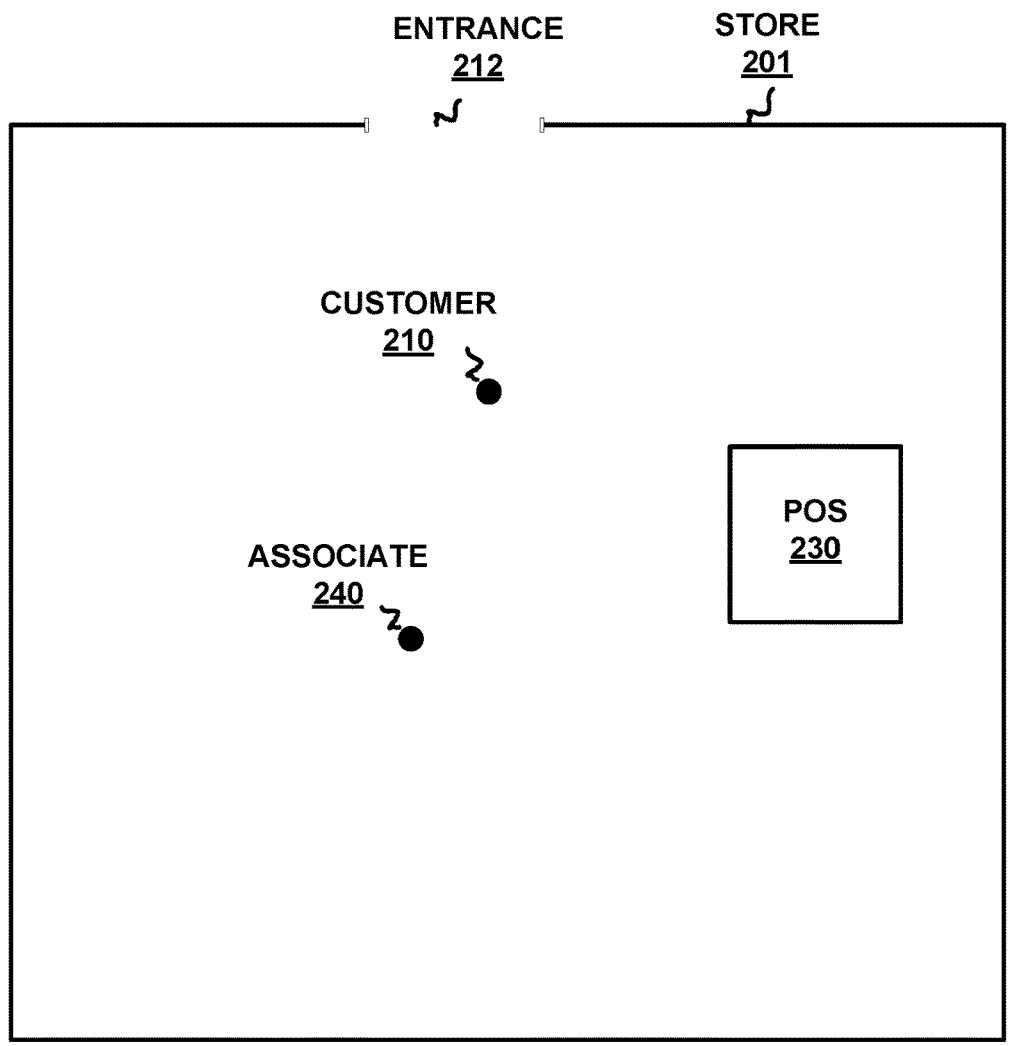
FIG. 2 is a top plan view of a retail store, in accordance with an embodiment.

Referring now to FIG. 2, a top plan view 200 of a store 201 is shown in accordance with an embodiment. In general, store 201 is any physical brick and mortar store that provides goods for sale at the store location. In one embodiment, store 201 includes an entrance 212. In addition, in different embodiments and configurations, store 201 can include one or more of, point of sale (POS) 230 (which could be a fixed location computing device, a store's mobile device, an electronic cash register, and the like), and an associate's mobile device 240.

Mobile device 240 (and in some cases POS 230) could be a smart phone, a tablet, a smart watch, a piece of smart jewelry, smart glasses, or other user portable devices having wireless connectivity.

In one embodiment, POS 230 and associate device 240 are connected to a network (e.g., Internet, local area network (LAN, or the like)), via near field communication (NFC), Bluetooth, WiFi, or the like. Although a number of examples are provided, the network and connections are not limited to only those examples.

In one embodiment, the result of the customer 210 is a customer (or a customer with a mobile device) who is attempting to accomplish a task that is normally controlled by the main rules system 110, such as, but not limited to, making a credit account payment, applying for a credit account, redeeming a reward from a reward program, adding the purchase points to a reward program, or the like.

Figure 3:
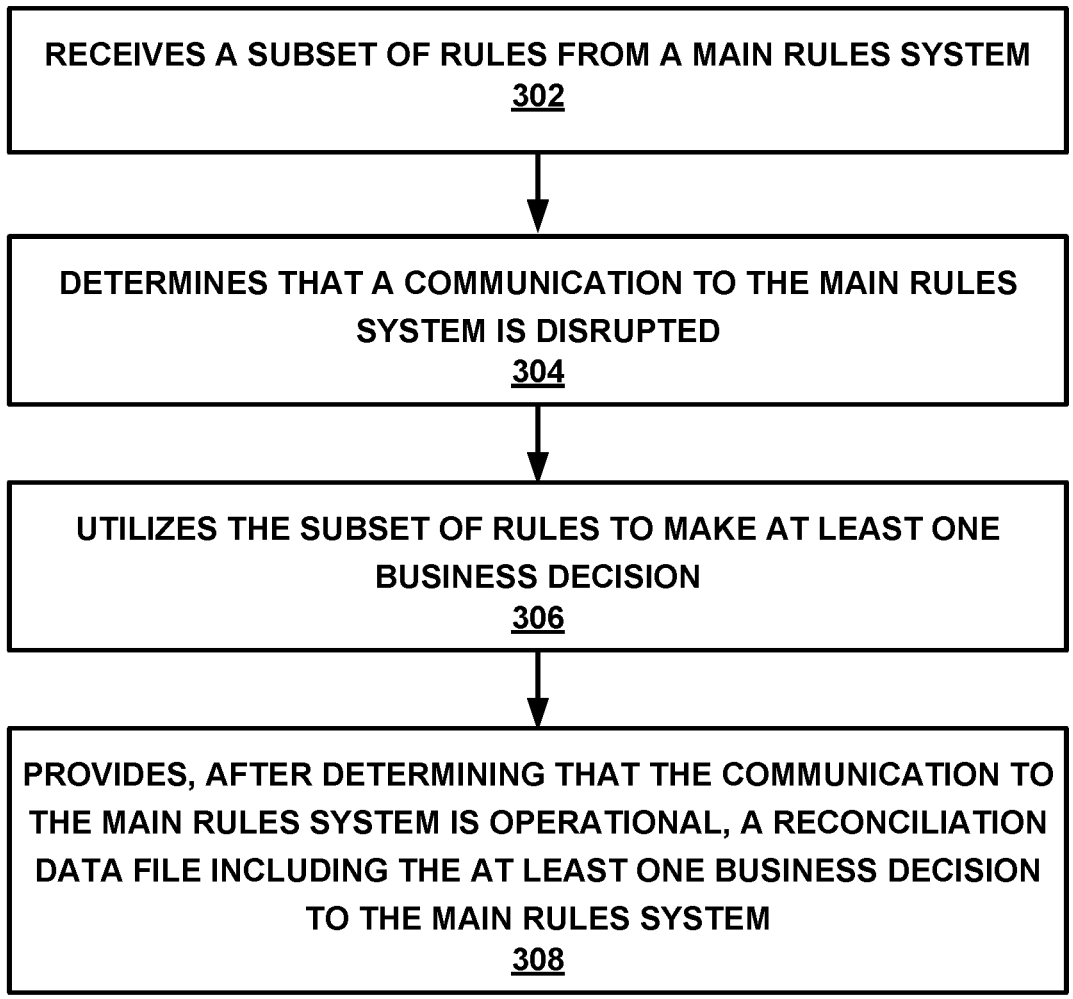
FIG. 3 is a flowchart of a method for providing distributed risk rules, in accordance with an embodiment.

With reference now to FIG. 3, a flowchart 300 of a method for providing distributed risk rules is shown in accordance with an embodiment. For example, one embodiment distributes out a subset of the rules and authorizations to the different retailers (e.g., subsystem 155), so that if the main rules system 110 goes down, the subset of rules and authorizations that have been distributed to the subsystem 155 are used instead of denying all operations. The subset of rules could be distributed to subsystem 155 such as point of sale (POS) systems, hand-held associate devices, or the like.

Referring now to 302 of FIG. 3, one embodiment receives a subset of rules from a main rules system 110. The subset of rules can include authorization rules, acquisition rules, private label rules, and the like. For example, a subset of rules could include rules such as: risk, credit limit assignments, account number and credit limit assignments, and authorization amounts available by account. Further, the rules could be the same as the regular rules, a modification of the regular rules, or a combination thereof. For example, a modification of the regular rules could be a reduction in a credit limit for a new account that is generated by subsystem 155 using the subset of distributed rules. Because of the smaller database, and thus reduced fraud determination capability, in one embodiment, when the subset of distributed rules are used to open an account, the credit limit of 2,500 dollars could be reduced to a lower amount. For example, the lower amount could be 500 dollars (or some other lesser number). Thus, the customer would be able to apply and open an account and make a purchase, but the credit limit would be lower until the main rules system 110 was able to vet the customer/application.

In one embodiment, the subset of rules could be distributed on a certain schedule, such as weekly, daily, monthly, or the like. In one embodiment, an updated subset of rules would be distributed only when a change to the subset of rules is made.

In one embodiment, the main rules system 110 distributes a plurality of different subsets of rules to a plurality of different subsystems 155. For example, the subset of rules could differ by retailer. The differences can include aspects such as different credit score thresholds and the like. These different rules primarily determine who is approved and the credit limit for the new account. These rules can include different criteria for one or more of the different retailers and the underlying calculations that drive approval and credit limits are often proprietary. Thus, a different subsystem 155 would be analogous to a different retailer. In one embodiment, each subsystem 155 is not going to receive the proprietary underlying calculations that are stored at the main rules system 110. Instead, each subsystem 155 will receive a simplified or "light" version of the underlying proprietary methodology. In one embodiment, the subset of rules is provided in an encrypted (non-accessible) format.

With reference now to 304 of FIG. 3, one embodiment determines that a communication to the main rules system 110 is disrupted. For example, when the main rules system 110 is not available, the retailers (or subsystem 155) will be able to feed the application, credit charge authorization, or the like, into the subset of rules utilizer 175. The subset of rules utilizer 175 will then allow the subsystem 155 to make a new account decision, receive an authorization, and the like.

In one embodiment, the subsystem 155 automatically determines that the communication to the main rules system 110 is disrupted after a pre-defined number of failed attempts to access the main rules system 110. For example, the determination could be made after five failed attempts. Although five failed attempts is used in one embodiment, it should be appreciated that the actual number of failed attempts could be different, could be defined by the main rules system 110, could be different for one or more different retailers, or the like.

In one embodiment, the subsystem 155 automatically determines that the communication to the main rules system 110 is disrupted after a pre-defined time period has tolled without obtaining access to the main rules system 110. For example, the determination could be made after three minutes. Although three minutes is used in one embodiment, it should be appreciated that the actual time period could be different, could be defined by the main rules system 110, could be different for one or more different retailers, could be different for different days (e.g., holidays, high sales volume days, or the like).

Referring now to 306 of FIG. 3, one embodiment utilizes the subset of rules to make at least one business decision. Thus, if the main rules system 110 goes down, the "next best" rules that have been distributed to subsystem 155 are used instead of denying all aspects of credit account use, reward card use, credit application approval, and the like. In one embodiment, distributing the rules to subsystem 155 can help to mitigate losses due to denial of service attacks, main rules system downtimes, weather related outages, and the like.

Since the distributed version is a "light" subset of the rules, the distributed subset of rules can have a higher established fraud risk threshold than the proprietary rules in main rules system 100 would provide. For example, a credit bureau may be contacted for a customer credit score when a customer applies for a credit account. In the main rules system 110, the customer credit score would carry a certain weight. However, other customer aspects available to the main rules system 110 (e.g., a different retailer account in the main rules system 110 with a good payment history, etc.) could help form the ultimate decision.

However, in the distributed rules subsystem 155 there may not be the access to the different retailer account information. As such, in the distributed rules subsystem 155, the credit score would carry much or all of the weight in the decision making process. Thus, a customer may qualify for a credit account in the main rules system 110, but the same customer would not qualify for the credit account based on the evaluation performed by subsystem 155.

With reference now to 308 of FIG. 3, one embodiment determines that the communication to the main rules system 110 is operational and provides a reconciliation data file to the main rules system 110, which includes at least one business decision to the main rules system 110. In one embodiment, the reconciliation from the subsystem 155 to the main rules system 110 could occur when contact is reestablished, or it could occur on a schedule such as weekly, daily, monthly, or the like, or the reconciliation could be provided during a reconnection after a disconnect has occurred and the subsystem 155 has had to use the distributed rules.

In one embodiment, the subsystem 155 can be used as a fallback by the main rules system 110 such as a service request reroute to the distributed rules system from the main rules system 110 call centers. For example, when the main rules system 110 detects the telephone service factor (TSF) is unfavorable (or moving toward unfavorable numbers), the main rules system 110 can direct some of the phone traffic to one or more subsystem 155 to handle flexible phone authorization requests such as small credit limit increases or other limited risk decisions that would normally be handled by an associate on the authorization line.

Figure 4:
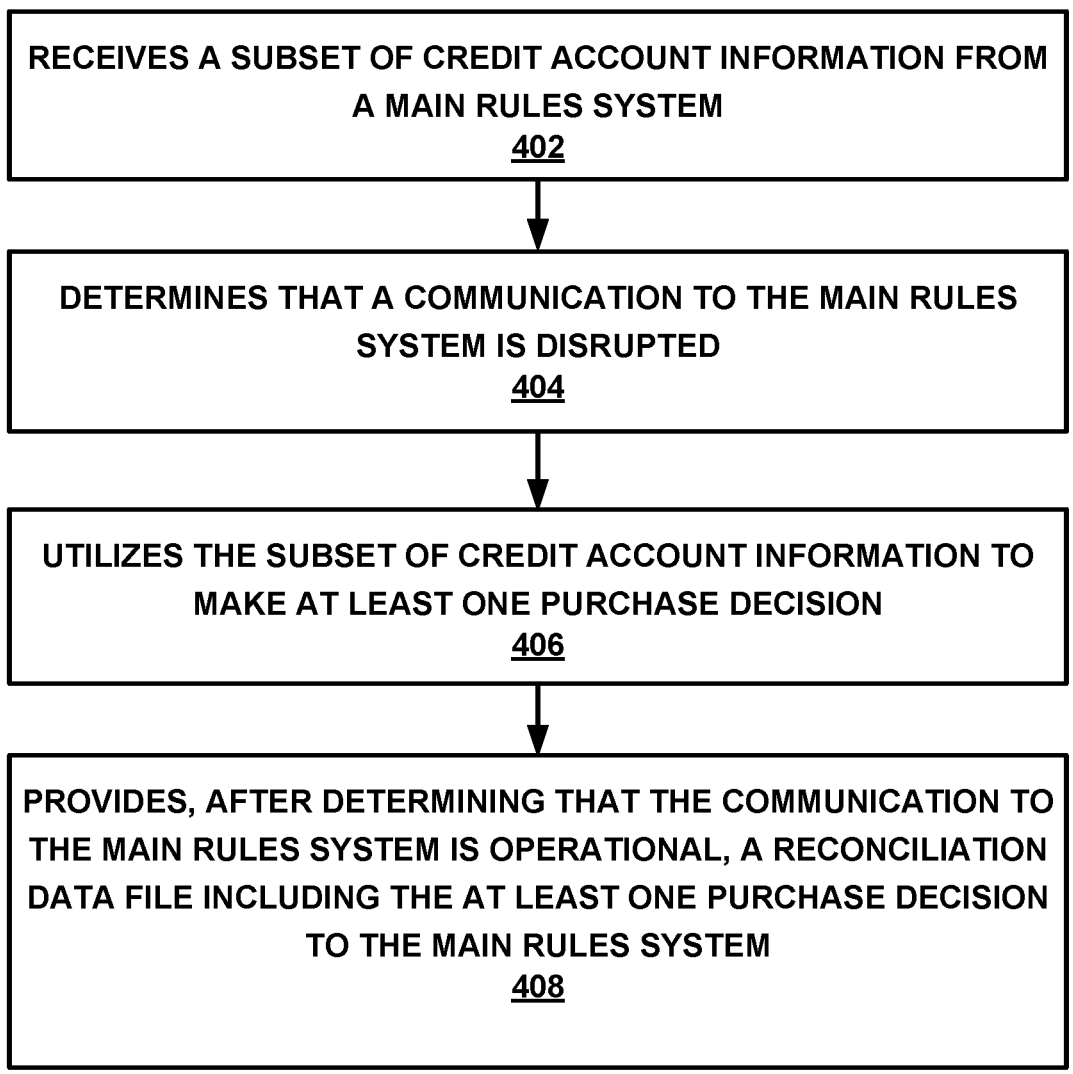
FIG. 4 is a flowchart of a method for providing distributed credit account information, in accordance with an embodiment.

With reference now to FIG. 4, a flowchart 400 of a method for providing distributed credit account information is shown in accordance with an embodiment. For example, one embodiment distributes out a subset of the credit account information for a given retailer (e.g., subsystem 155), so that if the main rules system 110 goes down, the subset of credit account information that have been distributed to the subsystem 155 are used instead of denying all purchase authorizations. The subset of credit account information could be distributed to subsystem 155 such as POS systems, handheld associate devices, add-on devices, or the like.

Referring now to 402 of FIG. 4, one embodiment receives a subset of credit account information from a main rules system 110. The subset of credit account information can include a credit account identifier, a credit account status (e.g., open, closed, hold, etc.), an amount of credit available on the credit account, and the like for each account in the subset of credit account information.

In one embodiment, the subset of credit account information could be distributed on a schedule such as weekly, daily, monthly, or the like. In one embodiment, an updated subset of credit account information would be distributed only when a change to the subset of credit account information is made.

In one embodiment, the main rules system 110 distributes a plurality of different subsets of credit account information to a plurality of different subsystems 155. For example, the subset of credit account information can differ by retailer. In one embodiment, the subset of credit account information is provided in an encrypted (non-accessible) format.

With reference now to 404 of FIG. 4, one embodiment determines that a communication to the main rules system 110 is disrupted. For example, when the main rules system 110 is not available, the retailers (or subsystem 155) will be able to feed the credit charge authorization into the subset of rules utilizer. The subset of rules utilizer 175 will then allow the subsystem 155 to authorize or deny the credit account purchase.

In one embodiment, the subsystem 155 automatically determines that the communication to the main rules system 110 is disrupted after a pre-defined number of failed attempts to access the main rules system 110. For example, the determination could be made after three failed attempts. Although three failed attempts is used in one embodiment, it should be appreciated that the actual number of failed attempts could be different, could be defined by the main rules system 110, could be different for one or more different retailers, or the like.

In one embodiment, the subsystem 155 automatically determines that the communication to the main rules system 110 is disrupted after a pre-defined time period has tolled without obtaining access to the main rules system 110. For example, the determination could be made after four minutes. Although four minutes is used in one embodiment, it should be appreciated that the actual time period could be different, could be defined by the main rules system 110, could be different for one or more different retailers, could be different for different days (e.g., holidays, high sales volume days, or the like).

Referring now to 406 of FIG. 4, one embodiment utilizes the subset of credit account information to make at least one purchase authorization decision. Thus, if the main rules system 110 goes down, the credit account information that has been distributed to subsystem 155 is used instead of denying all aspects of credit account use. In one embodiment, distributing the credit account information to subsystem 155 can help to mitigate losses due to denial of service attacks, main rules system downtimes, weather related outages, outage due to fire, earthquake, blackout, brownout, and the like.

Since the distributed version is a "light" subset of the credit account information, the distributed subset of credit account information can have a higher fraud risk threshold than the main rules system 100. For example, a customer alpha swipes their card for a purchase. The subsystem 155 checks to see if the transaction is authorized and obtains an authorization code. The main rules system 100 is down. The subsystem 155 performs a look-up for customer alpha's account in the distributed credit account information. If subsystem 155 determine that customer alpha has some available credit, then the transaction is approved. If subsystem 155 determines that customer alpha's account is closed or that not enough funds are available, or cannot make a determination based on the available information, then the transaction would be declined. For example, the credit account may be new and not have been provided in the subset of credit account information, the credit account may be recently paid and thus back in good standing but not yet reflected in the subset of credit account information, the credit limit may be close to being met and the last update to the subset of credit account information could be outside a given time period (e.g., days, hours, etc.), and the like.

With reference now to 408 of FIG. 4, one embodiment determines that the communication to the main rules system 110 is operational and provides a reconciliation data file to the main rules system 110, which includes at least one purchase authorization decision to the main rules system 110. In one embodiment, the reconciliation from the subsystem 155 to the main rules system 110 could occur when contact is reestablished, or it could occur on a schedule such as weekly, daily, monthly, or the like, or the reconciliation could be provided during a reconnection after a disconnect has occurred and the subsystem 155 has had to use the distributed credit account information. In one embodiment, after the reconciliation, there would be a new distributed list to the subsystems that would include the new account data for each of the credit account holders.

In one embodiment, the subsystem 155 will have a failsafe such that if the subsystem 155 has not been able to talk to the main rules system 110 for a given time period, (e.g., 24 hours, 48 hours, etc.) then the subsystem 155 will stop providing any transaction approvals until contact is established and the underlying distributed credit account information can be updated, validated, reconciled, or the like.

Example Computer System

Figure 5:
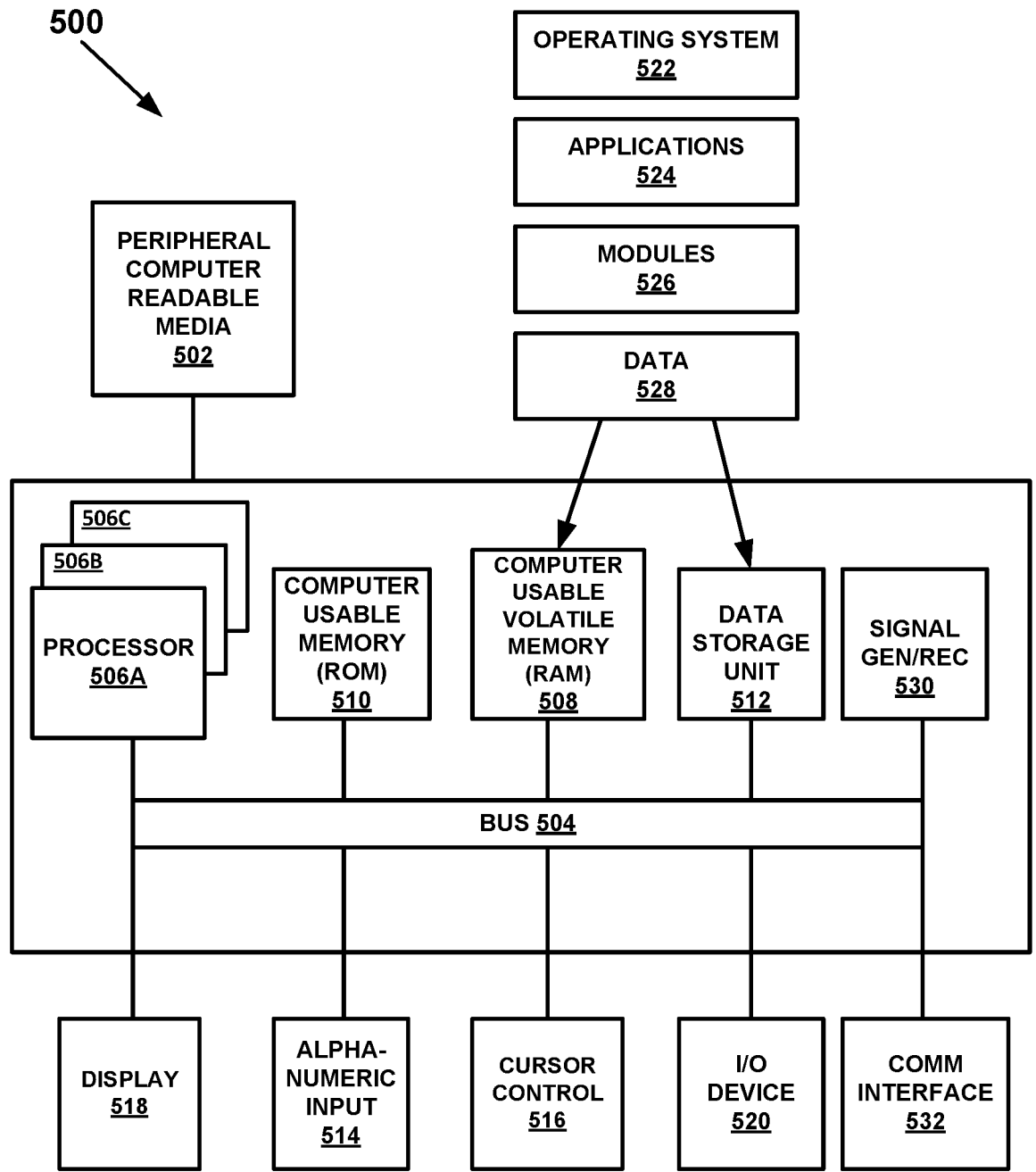
FIG. 5 is a block diagram of an example computer system with which or upon which various embodiments of the present invention may be implemented.

With reference now to FIG. 5, portions of the technology for providing a communication composed of computer-readable and computer-executable instructions that reside, for example, in non-transitory computer-readable medium (or storage media, etc.) of a computer system. That is, FIG. 5 illustrates one example of a type of computer that can be used to implement embodiments of the present technology. FIG. 5 represents a system or components that may be used in conjunction with aspects of the present technology. In one embodiment, some or all of the components described herein may be combined with some or all of the components of FIG. 5 to practice the present technology.

FIG. 5 illustrates an example computer system 500 used in accordance with embodiments of the present technology. It is appreciated that computer system 500 of FIG. 5 is an example only and that the present technology can operate on or within a number of different computer systems including general purpose networked computer systems, embedded computer systems, routers, switches, server devices, user devices, various intermediate devices/artifacts, stand-alone computer systems, mobile phones, personal data assistants, televisions and the like. As shown in FIG. 5, computer system 500 of FIG. 5 is well adapted to having peripheral computer readable media 502 such as, for example, a disk, a compact disc, a flash drive, and the like coupled thereto.

Computer system 500 of FIG. 5 includes an address/data/control bus 504 for communicating information, and a processor 506A coupled to bus 504 for processing information and instructions. As depicted in FIG. 5, computer system 500 is also well suited to a multi-processor environment in which a plurality of processors 506A, 506B, and 506C are present. Conversely, computer system 500 is also well suited to having a single processor such as, for example, processor 506A. Processors 506A, 506B, and 506C may be any of various types of microprocessors. Computer system 500 also includes data storage features such as a computer usable volatile memory 508, e.g., random access memory (RAM), coupled to bus 504 for storing information and instructions for processors 506A, 506B, and 506C.

Computer system 500 also includes computer usable non-volatile memory 510, e.g., read only memory (ROM), coupled to bus 504 for storing static information and instructions for processors 506A, 506B, and 506C. Also present in computer system 500 is a data storage unit 512 (e.g., a magnetic disk drive, optical disk drive, solid state drive (SSD), and the like) coupled to bus 504 for storing information and instructions. Computer system 500 also can optionally include an alpha-numeric input device 514 including alphanumeric and function keys coupled to bus 504 for communicating information and command selections to processor 506A or processors 506A, 506B, and 506C. Computer system 500 also can optionally include a cursor control device 516 coupled to bus 504 for communicating user input information and command selections to processor 506A or processors 506B and 506C. Cursor control device may be a touch sensor, gesture recognition device, and the like. Computer system 500 of the present embodiment can optionally include a display 518 coupled to bus 504 for displaying information.

Referring still to FIG. 5, display 518 of FIG. 5 may be a liquid crystal device, cathode ray tube, OLED, plasma display device or other display device suitable for creating graphic images and alpha-numeric characters recognizable to a user. Cursor control device 516 allows the computer user to dynamically signal the movement of a visible symbol (cursor) on display 518. Many implementations of cursor control device 516 are known in the art including a trackball, mouse, touch pad, joystick, non-contact input, gesture recognition, voice commands, bio recognition, and the like. In addition, special keys on alpha-numeric input device 514 capable of signaling movement of a given direction or manner of displacement. Alternatively, it will be appreciated that a cursor can be directed and/or activated via input from alpha-numeric input device 514 using special keys and key sequence commands.

Computer system 500 is also well suited to having a cursor directed by other means such as, for example, voice commands. Computer system 500 also includes an I/O device 520 for coupling computer system 500 with external entities. For example, in one embodiment, I/O device 520 is a modem for enabling wired or wireless communications between computer system 500 and an external network such as, but not limited to, the Internet or intranet. A more detailed discussion of the present technology is found below.

Referring still to FIG. 5, various other components are depicted for computer system 500. Specifically, when present, an operating system 522, applications 524, modules 526, and data 528 are shown as typically residing in one or some combination of computer usable volatile memory 508, e.g. random-access memory (RAM), and data storage unit 512. However, it is appreciated that in some embodiments, operating system 522 may be stored in other locations such as on a network or on a flash drive; and that further, operating system 522 may be accessed from a remote location via, for example, a coupling to the Internet. In one embodiment, the present technology, for example, is stored as an application 524 or module 526 in memory locations within RAM 508 and memory areas within data storage unit 512. The present technology may be applied to one or more elements of described computer system 500.

Computer system 500 also includes one or more signal generating and receiving device(s) 530 coupled with bus 504 for enabling computer system 500 to interface with other electronic devices and computer systems. Signal generating and receiving device(s) 530 of the present embodiment may include wired serial adaptors, modems, and network adaptors, wireless modems, and wireless network adaptors, and other such communication technology. The signal generating and receiving device(s) 530 may work in conjunction with one (or more) communication interface 532 for coupling information to and/or from computer system 500. Communication interface 532 may include a serial port, parallel port, Universal Serial Bus (USB), Ethernet port, Bluetooth, thunderbolt, near field communications port, WiFi, Cellular modem, or other input/output interface. Communication interface 532 may physically, electrically, optically, or wirelessly (e.g., via radio frequency) couple computer system 500 with another device, such as a mobile phone, radio, or computer system.

Computer system 500 is only one example of a suitable computing environment and is not intended to suggest any limitation as to the scope of use or functionality of the present technology. Neither should the computing environment be interpreted as having any dependency or requirement relating to any one or combination of components illustrated in the example computer system 500.

The present technology may be described in the general context of computer-executable instructions, such as program modules, being executed by a computer. Generally, program modules include routines, programs, objects, components, data structures, etc., that perform particular tasks or implement particular abstract data types. The present technology may also be practiced in distributed computing environments where tasks are performed by remote processing devices that are linked through a communications network. In a distributed computing environment, program modules may be located in both local and remote computer-storage media including memory-storage devices.

The foregoing Description of Embodiments is not intended to be exhaustive or to limit the embodiments to the precise form described. Instead, example embodiments in this Description of Embodiments have been presented in order to enable persons of skill in the art to make and use embodiments of the described subject matter. Moreover, various embodiments have been described in various combinations. However, any two or more embodiments may be combined. Although some embodiments have been described in a language specific to structural features and/or methodological acts, it is to be understood that the subject matter defined in the appended claims is not necessarily limited to the specific features or acts described above. Rather, the specific features and acts described above are disclosed by way of illustration and as example forms of implementing the claims and their equivalents.

What is claimed is:

1. A method for distributing credit account information, the method comprising:
  receiving, at a subsystem of a retailer's computer system, a subset of credit account information from a main rules system, the subset of credit account information comprising:
    an account identifier;

a credit available amount for each account in the subset of credit account information; and
a higher fraud risk threshold than a fraud risk threshold of the main rules;
storing, at a database coupled with said subsystem, said subset of credit account information;
determining, at the subsystem, that a communication to the main rules system is disrupted;
accessing, from said database via said subsystem, said subset of credit account information;
utilizing, at the subsystem, the subset of credit account information to make at least one purchase authorization while said communication to said main rules system is disrupted;
updating, at said database via said subsystem, said subset of credit account information to include said at least one purchase authorization;
activating a failsafe after said communication to said main rules system has been disrupted for a predefined time period, wherein said predefined time period is at least 24 hours;
declining any transaction requests once said failsafe has been activated;
determining, at the subsystem, that said communication to said main rules system is operational;
generating, at said subsystem, a reconciliation data file from said updated subset of credit account information of said database; and
providing, from said subsystem after said determining that the communication to the main rules system is operational, said reconciliation data file to the main rules system.

2. The method of claim 1, further comprising:
automatically determining that the communication to the main rules system is disrupted after a pre-defined number of failed attempts to contact the main rules system.

3. The method of claim 1, further comprising:
automatically determining that the communication to the main rules system is disrupted after a pre-defined time period has tolled without obtaining contact with the main rules system.

4. The method of claim 1, wherein receiving the subset of credit account information further comprises:
receiving the subset of credit account information in an encrypted format.

5. The method of claim 4, further comprising:
receiving the subset of credit account information at a proprietary device communicatively coupled with said subsystem, wherein any data stored on said proprietary device is inaccessible by any other electronic device at said subsystem.

6. A non-transitory computer-readable medium for storing instructions, the instructions comprising:
one or more instructions which, when executed by one or more processors of a subsystem of a retailer's computer system, cause one or more processors to:
access a subset of credit account information received from a main rules system, the subset of credit account information comprising:
an account identifier;
a credit available amount for each account in the subset of credit account information; and
a higher fraud risk threshold than a fraud risk threshold of the main rules;
store, at a database coupled with said subsystem, said subset of credit account information;
determine that a communication to the main rules system is disrupted;
access, from said database, said subset of credit account information;
utilize the subset of credit account information to make at least one purchase authorization while said communication to said main rules system is disrupted;
update, at said database, said subset of credit account information to include said at least one purchase authorization;
activate a failsafe after said communication to the main rules system has been disrupted for a predefined time period, wherein said predefined time period is greater than 24 hours;
decline any transaction requests once said failsafe has been activated;
determine that said communication to said main rules system is operational;
generate a reconciliation data file from said updated subset of credit account information of said database; and
provide, after said determination that the communication to the main rules system is operational, said reconciliation data file to the main rules system.

7. The non-transitory computer-readable medium of claim 6, where the one or more instructions further cause one or more processors to:
automatically determine that the communication to the main rules system is disrupted after a pre-defined number of failed attempts to contact the main rules system.

8. The non-transitory computer-readable medium of claim 6, where the one or more instructions further cause one or more processors to:
automatically determine that the communication to the main rules system is disrupted after a pre-defined time period has tolled without obtaining contact with the main rules system.

9. The non-transitory computer-readable medium of claim 6, wherein the subset of credit account information is maintained in an encrypted format.

10. The non-transitory computer-readable medium of claim 6, where the one or more instructions further cause one or more processors to:
utilize the subset of credit account information via a proprietary device communicatively coupled with said subsystem to make said at least one purchase authorization while said communication to said main rules system is disrupted, wherein any data stored on said proprietary device is inaccessible by any other electronic device at said subsystem.

11. A system comprising:
a main rules system comprising:
a memory;
a communications capability;
a storage, to store a set of credit account information; and
one or more processors to:
develop a subset of credit account information from the set of credit account information the subset of credit account information comprising:
an account identifier;
a credit available amount for each account in the subset of credit account information; and
a higher fraud risk threshold than a fraud risk threshold of the main rules; and distribute the subset of credit account information to at least one subsystem of a retailer's computer system; and said at least one subsystem of a retailer's computer system, said at least one subsystem comprising:

a subsystem memory to store said subset of credit account information; and one or more subsystem processors to:
- access, from said subsystem memory, the subset of credit account information received from the main rules system;
- determine that a communication to the main rules system is disrupted;
- utilize the subset of credit account information to make at least one purchase authorization while said communication to said main rules system is disrupted;
- update, at said subsystem memory, said subset of credit account information to include said at least one purchase authorization;
- activate a failsafe after the communication to the main rules system has been disrupted for a predefined time period, wherein said predefined time period is at least 24 hours;
- decline any transaction requests once the failsafe has been activated;
- determine that said communication to said main rules system is operational;
- generate a reconciliation data file from said updated subset of credit account information of said subsystem memory; and
- provide, after said determination that the communication to the main rules system is operational, said reconciliation data file to the main rules system.

12. The system of claim 11, where the one or more subsystem processors are further to:
automatically determine that the communication to the main rules system is disrupted after a pre-defined number of failed attempts to contact the main rules system.

13. The system of claim 11, where the one or more subsystem processors are further to:
automatically determine that the communication to the main rules system is disrupted after a pre-defined time period has tolled without obtaining contact with the main rules system.

14. The system of claim 11, where the at least one subsystem comprises:
a proprietary device communicatively coupled with said at least one subsystem,
the proprietary device to store said subset of credit account information; and
any data stored on said proprietary device is inaccessible by any other electronic device at said at least one subsystem.

* * * * *